United States Patent [19]

Bone

[11] Patent Number: 4,639,555
[45] Date of Patent: Jan. 27, 1987

[54] PAIR CUT APPARATUS AND METHOD OF USE

[75] Inventor: Ronald N. Bone, Dallas, Tex.

[73] Assignee: Southwestern Bell Telephone Company, St. Louis, Mo.

[21] Appl. No.: 709,792

[22] Filed: Mar. 8, 1985

[51] Int. Cl.$^4$ .............................................. H04Q 1/18
[52] U.S. Cl. ...................................... 379/327; 379/22
[58] Field of Search ................. 179/175.3 R, 175.3 F, 179/175, 98

[56] References Cited

U.S. PATENT DOCUMENTS

| | | | |
|---|---|---|---|
| 3,755,632 | 8/1973 | Johnson | 179/175.3 |
| 4,127,748 | 11/1978 | Gillemot | 179/98 |
| 4,317,967 | 3/1982 | De Vries et al. | 179/175.3 R |

*Primary Examiner*—Gene Z. Rubinson
*Assistant Examiner*—David R. Schuster
*Attorney, Agent, or Firm*—Neal Kalishman

[57] ABSTRACT

A method and device for reducing the cost and out of service time in repairing defective wire pairs in telephone networks. The device comprises a cable having metal prongs on each end which correspond to the receptacles on the protector block which is located on the vertical component of the central office distributing frame. The device is used to connect the receptacles on the protector block that are connected to a new functioning pair of field wires to the receptacles on the protector block of the office wires of the nonfunctioning old pair of wires. Thus, restoring service to a customer through a new wire pair until permanent wiring can be installed on the horizontal component of the central office distributing frame.

13 Claims, 5 Drawing Figures

PAIR CUT APPARATUS AND METHOD OF USE

BACKGROUND OF THE INVENTION

1. Field of the Invention

The invention relates to temporary repair of telephone networks when a pair of wires between a field cable service box and the central telephone switching office has become defective. Due to the specialized nature of telephone transmission, those skilled in the art are those individuals that have day to day responsibility for the installation and maintenance of the nation's regional telephone networks. Specific reference is made to the standard operating procedures employed by the various regional operating companies. More specifically, the field of the invention relates to those telephone networks which employ a distributing frame having protector blocks.

2. Discussion of the Prior Art

A grave problem which plagues the telephone system, affecting both economic return and customer satisfaction, isthe repair of defective wire pairs. Pairs of wires which have been damaged between field service boxes, such as, the terminal or cable closures i.e. pedestals serving the subscriber's premises and the central office often disrupt service to the customer. Such disruptions or lack of total service can last from four to eighteen hours. (Over 30% of the disruptions are not solved within eight business hours.)

The disruption of telephone service for long periods creates severe customer dissatisfaction. It also disrupts trade and commerce since no communication is possible. The lack of telephone service obviously can create dangerous conditions since the customer is precluded from communicating with emergency personnel.

Disruptions due to defective cable pairs are not isolated incidents. In the Dallas telephone region during the period from Apr. 1, 1983 to Apr. 1, 1984, there were approximately 58,500 incidences of loss of service due to single cable pairs going defective. The number of such incidents nationwide is in the millions and the cost to restore service typically is $216.25 per incident. The national cost of this problem is hundreds of millions of dollars.

The telephone network basically comprises pairs of wires which connect the premises of individual customers to a central office. FIG. 1 traces the path of a pair of wires from a customer's premises in the field to a central telephone switching office.

The wires known as the station wires from the customer premises 10 are attached through a protector or arrestor, which bleeds off high voltages, to a pair of wires known as a service wire or "drop" 12. The two wires which comprise the service wire 12 are referred to as the "tip" 14 wire and the "ring" 16 wire. The service wire 12 runs from the customer premises to a field service box 18, such as, a terminal located on a pole if the cables are aerial or to a cable closure or pedestal which sits on the ground if the cables are buried. The "tip" 14 and "ring" 16 wires are the basic wires of the network.

A terminal or cable closure 18 as shown in FIG. 2 has a number of sets of posts 20. Each set of posts 20 is attached to a pair of wires that together form the cable 28. The service wire 12 from the customer premises is connected to a particular pair of posts as per the assignment of the telephone company. More than one customer may use the same terminal or cable closure 18. However, each customer's service wire 12 is attached to its own assigned set of posts 20. If a customer's service wire 12 is not attached to the correct posts, they will not be able to receive or transmit telephone calls since the telephone company computer will be sending their calls through the wrong pair of wires.

The wire pairs from a terminal or cable closure join other pairs of wires to form a cable 28. The cable 28 is intercepted at various points by other terminals and cable closures 18 in order to allow the wires from additional customers to join in the use of the cable. Wires from the cable are attached to the posts 20 of these terminals and cable closures 18. In order to provide flexibility to the network a wire pair may be attached to posts at one or more terminals or cable closures. Thus, it is important for the technician to know whether a pair of wires is in working condition and whether another customer is using said pair before attaching a customer's service wire to a particular pair.

Usually the cable that passes through a line of terminals or cable closures joins other cables 28 at a field service box which is referred to as a "servicing area interface" 24. Each pair of wires from each of the cables is attached to a pair of posts. These posts are wired to a second set of posts which are connected to pairs of wires from a larger cable 26 that goes to the telephone company central office 30. Cable 26 may pass through additional field service boxes 24. Again it is important that the proper posts be wired together to insure that the customer receives their telephone calls and dial tone. These field connector boxes are usually readily accessible to technicians and therefore provide a preferred location for switching customer pair assignments.

The wire pair may have a load coil, or inductors attached which negates transmission losses prior to entering the telephone company central office 30. A typical cable entering a central office has 2100 pairs. A rural central office will have far fewer pairs, whereas, a large city central office will have a large number of pairs and cables. In the basement or vault of the central office the cable is spliced to the central office wiring.

As shown in FIG. 3 the wire pairs are strung from the basement 32 to a distributing frame 34 which is on an upper floor of the central office. This frame has a vertical 36 and horizontal 38 component. Located on the vertical component of the frame are protector blocks 40 containing a protector for each wire pair. The purpose of the protector blocks 40 is to protect the central office equipment from excessive voltage or current surges. The frame is a metal support structure having protector blocks 40 mounted on its front face. The protectors have metal prongs which plug into the front of the blocks and connect the wire pairs from the field that have entered the central office to jumper wires 42 that connect the incoming field wires to the horizontal component 38 of the distributing frame 34. The vertical component 36 of the frame 34 is the terminating point of the outside or field wire pairs from cable 26.

The horizontal component 38 of the distributing frame 34 is the basic frame of the central office 30. All of the central office wire pairings are contained on this frame. Although two wires may have been adjacent in a cable they could be widely separated on the frame. This is to allow the even distribution of the circuit usage to the switching equipment. These frames can be hundreds of feet long and contain thousands of wires. The horizontal component of the frame is a series of vertically stacked horizontal supports or shelves upon which the wires are laid. The shelves contain posts upon which the jumper wires 42 from the vertical component 36 of the frame are attached. The posts containing the jumper wire pairs are then attached to a second set of posts which have corresponding wire pairs attached for permanent connection with the switching equipment.

The distributing frame 34 thus provides a means to associate through cross-connect wiring any of the thousands of possible combinations of cable wire pairs to office switching equipment. As in the field, it is important that the customer's wires be attached to their assigned posts. It is very difficult to trace stray wires on the horizontal component 38 of the frame since there are hundreds of wires lying on each of the frame's horizontal shelves or supports. As would be expected the design, sizes and numbers of these distributing frames vary depending on the switching office size, type of switching equipment, features etc.

A problem arises when a pair of wires becomes defective in the field and a loss of service results. The customer reports the loss of service. This report is general, "I don't have dial tone" or "I cannot be called." The telephone company dispatches a repair technician to determine the location of the damage and restore service. Under the present system the customer usually will not have service restored for four hours from the time the technician arrives.

The traditional method for solving cable problems requires the field technician to coordinate the activities of the repair procedure. This is a very inefficient manner of solving cable problems since the technician has limited knowledge of the intricate cable route and limited equipment. Another problem is that the telephone companies have grown so large that they have been required to segregate different functions in different departments. It can be difficult for a technician in the field to coordinate with all of the various departments involved in a defective cable situation. Breaks that occur in rural areas are especially expensive since not only must a field technician be dispatched but, since the central offices are usually not manned, a central office technician must also be sent.

Briefly, when a technician reaches the premises of a nonworking telephone he checks the cable pair to determine where the trouble has occurred. If the break has occurred between a field service box, such as, a terminal, cable closure, or "servicing area interface" and the central office and cannot be readily repaired, then the customer must be connected to a new set of wire pairs. This transfer usually occurs at the "servicing area interface" box. In many cases defective wire pairs are not repaired until a later date since it is not economical to isolate each wire pair fault and repair it. The telephone company normally waits until there is a number of repairs to be made on a cable and then repairs all at one time. Also, the out of service time until a wire fault is located and repaired can be several days. Therefore, the normal procedure is to abandon the defective wire pair and connect the customer to a different functioning vacant pair which is available in the same field connection box.

Transferring a customer to a new cable pair requires the efforts of several departments. If all of the relevant company units are not consulted about the change, the customer might not receive its telephone calls or could be disconnected. All of the telephone company computers, records and switching equipment must be revised to contain the new routing prior to implementation of the change.

A typical repair procedure is as follows:
1. Technician calls the records center to ascertain which pairs, in the field connection box, services the customers and attempts to locate fault with ohm meter.
2. If technician cannot repair trouble, he again calls the record center to obtain vacant functioning wire pairs for testing.
3. The technician then calls the distributing frame personnel in order for them to jointly test the vacant pairs to insure that they will work.
4. The technician must then call the maintenance center for authority to switch the customer line or "drop" to a vacant pair.
5. After receiving authority to switch pairs the technician calls the records center to notify them of the change so that they can begin revising manual and computerized records to reflect the use of the new pair.
6. The technician removes the customer wire from the old cable pair and attaches it to the new cable pair in the field.
7. Following the transfer the technician contacts the frame personnel to make necessary changes.
8. Technician notifies central office administration center to make necessary software computer changes in the central office switching equipment.
9. The technician then notifies the maintenance center that the transfer has been completed in the field and leaves the customer's premises. Dial tone has not been restored. (165 minutes have elapsed.)
10. The frame personnel then receive the necessary information from the computer system to connect the new cable pair with the switching equipment and disconnect the old cable pair. (total time 225 minutes)

There have been a number of attempts in the past to solve the problems encountered by the above method. Numerous attempts to solve the problem have been suggested, tried and have failed in efforts to reduce total duration time required of all involved work groups to restore service in the previous methods. However, all of these attempts have involved changing the connections on the distributing frame and still required changing records and distributing these changes before any work would begin, the administrative chain of events that must occur with the old procedure has never lended itself to successful revisions to reduce restoral time.

It is natural to assume, since actual changing of the pairings takes place at the distributing frame, that this would be the most likely spot to attempt to modify the procedure. Instead others have learned that the nature of the horizontal component of the distributing frame does not lend itself for an improvement of the procedure. This is due to the size of the frame, the location of the pairings, and manner in which the wires are connected. The pairings as they come from the vertical component of the distributing frame are not placed adjacent but can be separated by hundreds of feet and each wire is individually connected. Also, the beginning of the office wiring is located on the horizontal component of the distributing frame. Since the wire pairs entering the protector blocks are considered field wires and are permanent wiring, it would not be logical to make changes in the office wiring at this location.

The present invention is advantageous in that it is more economical than traditional methods and it places the customer back in service faster. It is also advantageous in that it allows each function to be performed by the department most proficient at that task and for control of the repair operation to be vested in the central office. A further advantage is that it allows certain tasks to be performed during slack periods. Still other advantages include greater reliability that service will be restored promptly, fewer missed appointments, fewer callbacks, and greater technician productivity. The device of the invention is advantageous in that it is simple to operate and inexpensive. Another advantage of the device is that it allows implementation of simplified repair procedures.

SUMMARY OF THE INVENTION

The method of the invention provides a means for restoring service in telephone networks in which a fault has occurred between a field box and the central office. The networks contain pairs of wires which originate at customer's premises, field connection boxes and protector blocks located on the central office distributing frame. The protector blocks have recepticals for mating with the protectors in order to connect the office wire pairs and the field wire pairs.

The method of the invention involves locating a field connection box which is between the customer's premises and the fault and connecting the nonfunctioning pair of wires which runs towards the customer's premises and which has been assigned to the customer to a second unassigned functioning pair of wires which runs to the central switching office. Also, removing the protectors on the cable protector block from the nonfunctioning pair of wires which has been assigned to said customer and from said second unassigned functioning pair of wires. Further, with a cable which has a connecting means on each of its ends, connecting one end of said cable to the receptacles that correspond to the office wires which has been assigned to said customer and connecting the other end of said cable into the receptacles that correspond to the field wires of said second unassigned pair of wires.

The invention also comprises a device comprising a cable containing wires and connecting means at each end of the cable which are suited for connecting into the corresponding recepticals of the protector blocks.

DESCRIPTION OF THE PREFERRED EMBODIMENTS

Contrary to the teachings of the prior art it has been found that service can be quickly and economically restored through a new wire pair by connecting the new and old pair at the protector blocks. Thus, avoiding the necessity of making the wiring and computer changes prior to restoring service. Restoring service is the providing of a dial tone which gives the customer the full ability to utilize his phone. Under the principles of the invention service is restored in 15 minutes at a cost of $73.50. This is opposed to the prior art methods which required 225 minutes and a cost of $216.25. Thus, a 95% savings in time in restoring service and a 67% savings in cost. The total time to implement the procedure is 90 minutes, however, it must be emphasized that the customer has service after the first fifteen minutes. Nationally such savings are in the millions of dollars.

Figure 1:
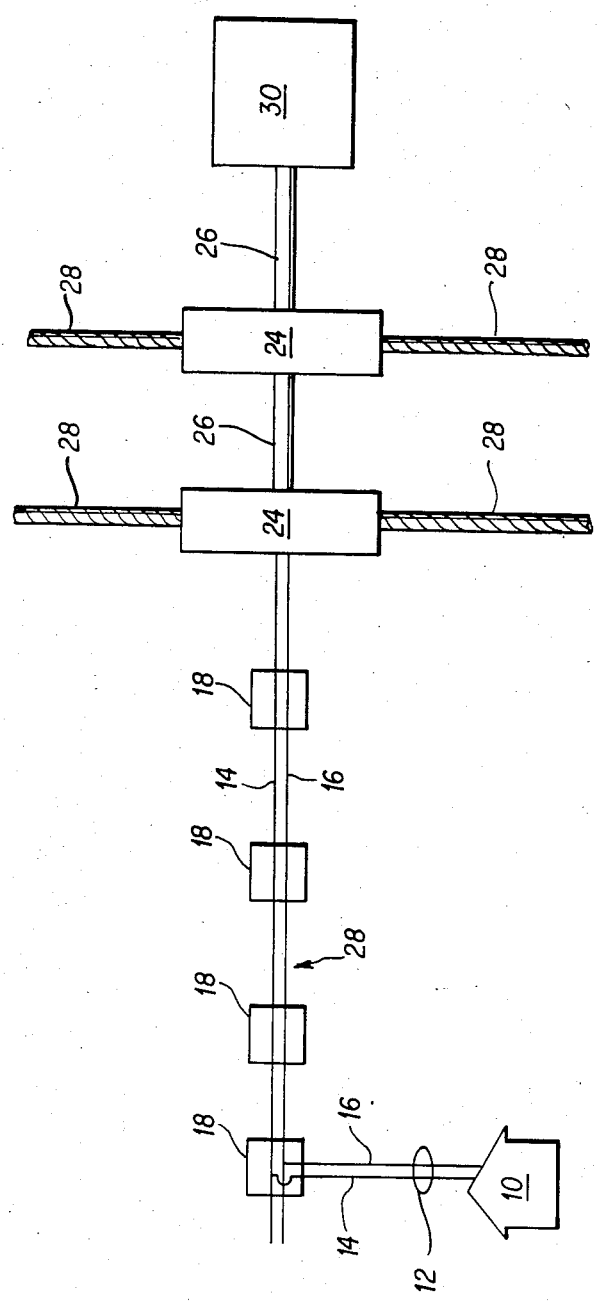
FIG. 1 is a general block diagram showing the path of a wire pair from a customer's premises to a central switching station.
Figure 4:
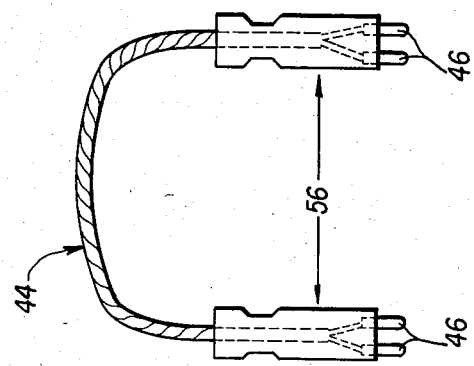
FIG. 4 shows the device of the invention.
Figure 5:
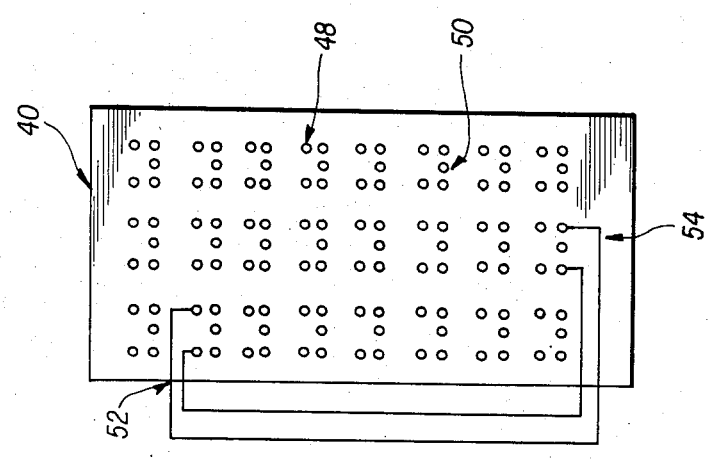
FIG. 5 illustrates a general form of a protector block.
Figure 2:
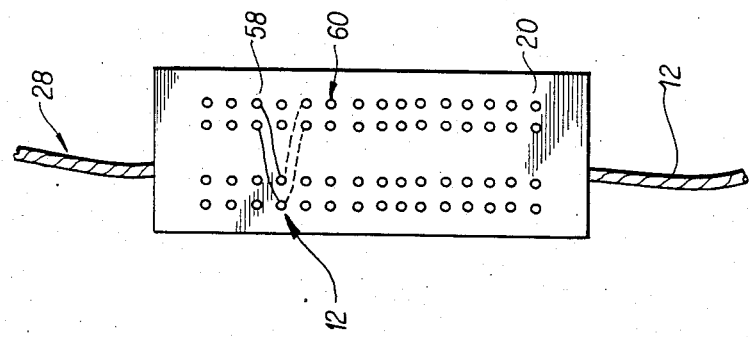
FIG. 2 illustrates a general form of a field connection box.
Figure 3:
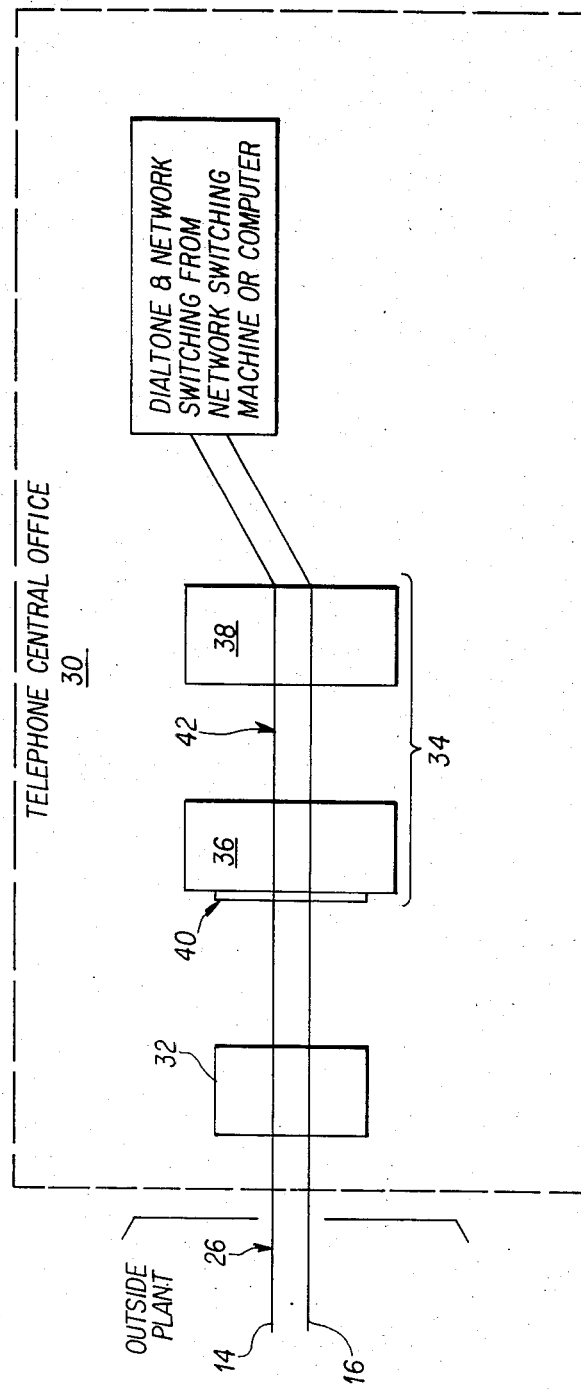
FIG. 3 is a general block diagram showing the path of a wire pair from the field through the distributing frame.

The preferred device 56, as illustrated in FIG. 4, is comprised of 0.15 inch diameter conductor cord 44 having two wires. Its length is either 3 feet, 6 feet, 9 feet or 12 feet. At both ends of the conductor cord are two metal prongs 46 each 0.093 inches diameter and having brass gold flashing. The distance between the prongs is 0.437 inches. They are designed to mate with the recepticals 48 of the protector block 40 as shown in FIG. 5. The prongs should be marked to insure that they are inserted to obtain the correct polarity.

The device in the alternative could contain a protector unit. Such a protector would provide protection to the central office equipment from excessive voltages and currents that might be induced on the cable. If a protector is included in the device the end which is plugged into the office wires going to the horizontal frame component would have a ground prong. The protector block has a position 50 for a third prong since the protectors usually have such a prong. The device is used to provide temporary service to the customer until a permanent connection is made.

As illustrated in FIG. 5, one end of the device is plugged into the protector block position 52 of the field wires for a new pair and the other end is plugged into the position 54 of the office wires for the old pair; thus, providing service on the new pair without first having to change the switching computer. At a convenient time the telephone company can change records and the office wires thus switching to the new pair. Under the method of the prior art all of the changes had to be made prior to the restoration of service.

The new procedure which is made feasible by the device of the invention allows the computer and switching equipment to continue using the old pair assignments until the new pair is wires to the horizontal component of the distributing frame. That is, the computers and switches route calls down the old wire pairs to the vertical component of the distributing frame. The device or "shoe" 56 transfers the call to the new pair at the protector block 40 which is located on the vertical component 36 of the frame 34. Since the customer's service wire 12 is attached to the new pair at a field connection box 18, such as, a terminal, cable closure or "servicing are an interface" he receives the call through the new pair in the normal fashion. The computers, switches and central office wiring can be permanently changed to the new pair at the convenience of the company.

By use of the "shoe" 56 the integrity of the records of the telephone company are not affected. When the new pair is wired into the horizontal component 38 of the distributing frame 34 the "shoe" or connector device 56 is removed and the protectors reinserted into the protector block 40 on the vertical frame component 36. The customer's service remains uninterrupted during the transition. In rural areas, frame personnel do not need to be sent to the central office at the time of the service disruption. The field technician is capable of removing the protectors and inserting the "shoe" or connector device 56. The central office technician can make the necessary wiring changes dueing their normal routine periodic maintenance visits.

Utilizing the device of the invention the following procedure is employed:

1. Technician arrives at premises and goes to terminal or service area interface and calls Maintenance Center tester and attempts to locate fault. Maintenance Center tester has a complete set of drawings showing the cable route and location of cable pairs. Maintenance Center tester assists technician giving cable route and terminal locations.

2. The Maintenance Center tester authorizes a line station transfer, a switch to a new cable pair, only after all efforts to clear the trouble have failed.

3. The Maintenance Center tester, with technician on line, calls the department that maintains the records and acquires a list of all unassigned functioning pairs and the cable records for the cable range in question.

4. With technician still on line, the Maintenance Center tester calls the frame. Frame personnel and Maintenance Center tester jointly test the available pairs by receiving shorts from the technician in the field.

5. When a good pair is found, the Maintenance Center tester rings out on the pair and "talks out" the circuit with the outside technician to insure it is a good pair.

6. The Maintenance Center tester then gives the field technician the go-ahead to transfer the customer's line or service wire 12 to the new cable pair 58 from the old pair 60.

7. The Maintenance Center tester has the frame personnel plug the connector device or "shoe" 56 of the invention into the receptacles 48 of the protector block 40 of the central office side of the original nonfunctioning cable pair 54 to the field side of the new functioning cable pair 52 in order to temporarily feed dial tone to the customer.

8. The Maintenance Center tester retests the circuit and releases technician. The customer has regained service in fifteen minutes.

9. The Maintenance Center tester calls the records center and furnishes information regarding the cable pair used and any other defective pair information.

10. The proper orders are generated from the records center to reprogram the switching computer to utilize the customers new pair. The frame personnel rewire the horizontal component of the distribution frame by connecting the new wire pair to the switching equipment and disconnecting the old wire pair then remove the device 56 of the invention. The customer has now been permanently switched to a new cable pair without loss of service during the interim. (total time 90 minutes)

The above procedure permits the use of a central coordinator (Maintenance Center tester) who is best prepared to analyze and coordinate the situation. It allows each department to work at maximum efficiency. When the repairman leaves the customer premises the service has been restored and the customer has been satisfied. This is opposed to the conventional method where the technician leaves the premises with the customer not having dial tone and wondering whether the mysterious central office really knows of the existing problem. Thus, the present invention provides significant improvements in customer service, competency, productivity and economy.

The invention is not limited to a particular type of telephone network. The designs of the central offices, distributing frames, field connection boxes, protector blocks, protectors, etc. will vary depending on the circumstances. All methods and devices which are equivalent to that which is disclosed herein are intended to be included within the following claims. Including the use of conventional protectors connected by a wire pair in place of the molded pronged device shown in FIG. 4.

I claim:

1. A method of restoring service in telephone networks in which a fault has occurred between a field box and a central office wherein said networks contain pairs of wires which originate at a customer's premises; field connection boxes which connect pairs of wires; and cable protector blocks on a central office distributing frame which contain protectors having means for connecting with corresponding receptacles on said protector block wherein each protector connects a pair of wires from the field with its corresponding pair of office wires comprising:
   (a) in a field box, which is located between the customer's premises and the fault, connecting the non-functioning pair of wires which runs towards the customer's premises and which has been assigned to the customer to a second unassigned functioning pair of wires which runs to the central switching office;
   (b) removing the protector on the cable protector block from the non-functioning pair of wires which has been assigned to said customer and from said second unassigned functioning pair of wires;
   (c) with a connecting cable which has connectors on each of its ends, connecting one end of said cable with the receptacles on the cable protector block that corresponds to the office wires of the non-functioning pair of wires which has been assigned to said customer and connecting the other end of said cable with the receptacles on the cable protector block that correspond to the field wires of said second unassigned pair of wires.

2. The method of claim 1 wherein said field box is a terminal.

3. The method of claim 1 wherein said field box is a cable closure.

4. The method of claim 1 wherein said field box is a servicing area interface.

5. The method of claim 1 wherein said connecting cable further contains a protector.

6. The method of claim 1 wherein said protectors are mounted on the vertical component of the distributing frame.

7. Th method of claim 1 wherein said protectors have metal prongs for plugging into the receptacles of the protector block.

8. The method of claim 7 wherein said protectors have five prongs.

9. The method of claim 7 wherein said connecting cable has metal prongs which correspond to those contained on the protectors.

10. The method of claim 1 wherein said connecting cable contains a protector means.

11. The method of claim 9 wherein said connecting cable contains a protector means.

12. The method of claim 6 wherein said distributing frame further comprises a horizontal component.

13. The method of claim 1 wherein said cable contains a wire for each receptacle and its length is at least one foot long.

* * * * *